United States Patent
Tamir et al.

(10) Patent No.: US 8,374,157 B2
(45) Date of Patent: Feb. 12, 2013

(54) WIRELESS DOCKING STATION

(75) Inventors: Tal Tamir, Even Yehuda (IL); Daniel Rettig, Karkur (IL)

(73) Assignee: Wilocity, Ltd., Caesarea (IL)

( * ) Notice: Subject to any disclaimer, the term of this patent is extended or adjusted under 35 U.S.C. 154(b) by 907 days.

(21) Appl. No.: 11/964,715

(22) Filed: Dec. 27, 2007

(65) Prior Publication Data

US 2008/0195788 A1 Aug. 14, 2008

Related U.S. Application Data

(60) Provisional application No. 60/889,379, filed on Feb. 12, 2007.

(51) Int. Cl.
*H04W 4/00* (2009.01)
(52) U.S. Cl. .................. 370/338; 370/344; 710/303
(58) Field of Classification Search .................. None
See application file for complete search history.

(56) References Cited

U.S. PATENT DOCUMENTS

| | | | |
|---|---|---|---|
| 5,923,757 A | 7/1999 | Hocker et al. | |
| 5,930,368 A | 7/1999 | Hocker et al. | |
| 6,170,026 B1 | 1/2001 | Kimura et al. | |
| 6,937,468 B2 | 8/2005 | Lin et al. | |
| 2004/0122771 A1* | 6/2004 | Celi et al. | 705/43 |
| 2004/0220803 A1* | 11/2004 | Chiu et al. | 704/214 |
| 2005/0075080 A1* | 4/2005 | Zhang | 455/73 |
| 2005/0246470 A1* | 11/2005 | Brenner | 710/303 |
| 2006/0061963 A1 | 3/2006 | Schrum | |
| 2006/0080722 A1* | 4/2006 | Santhoff | 725/116 |
| 2006/0233191 A1* | 10/2006 | Pirzada et al. | 370/463 |
| 2007/0173202 A1* | 7/2007 | Binder et al. | 455/68 |
| 2007/0189270 A1* | 8/2007 | Borislow et al. | 370/352 |
| 2007/0291636 A1* | 12/2007 | Rajagopal et al. | 370/208 |

* cited by examiner

*Primary Examiner* — Jianye Wu
(74) *Attorney, Agent, or Firm* — Myers Wolin, LLC

(57) ABSTRACT

A wireless docking station that allows a wireless connection between a computing device, for example a hand-held computing device, and a plurality of peripheral devices. This is achieved by providing the computing device with a wireless connectivity bus. The computing device may be, but is not limited to, a personal computer, a laptop, a notebook, a media player, a mobile phone, a personal digital assistant (PDA), and the likes.

22 Claims, 3 Drawing Sheets

US 8,374,157 B2

WIRELESS DOCKING STATION

CROSS-REFERENCE TO RELATED APPLICATIONS

This application claims the benefit of U.S. Provisional Application No. 60/889,379, filed on Feb. 12, 2007, the contents of which are herein incorporated by reference. The invention is also related to co-pending US provisional application 60/938,190 entitled "A Wireless Interconnect Bus" and in US provisional application entitled 60/950,691 "A Distributed Interconnect Bus". Both applications are assigned to common assignee and which are hereby incorporated herein, in their entirety, by reference thereto.

TECHNICAL FIELD

The invention relates generally to peripheral component interconnect buses, and more particularly to interconnect buses over a wireless medium.

BACKGROUND OF THE INVENTION

As technology has evolved the functionality of mobile devices, such as laptops computers, cellular phones, personal digital assistants (PDAs), and media players, has become correspondingly more robust. Such devices now offer capabilities that were once the exclusive domain of personal computers (PCs). In fact, some of these mobile devices now resemble small, low-end PCs with wireless access to data networks, including the Internet.

Unlike desktops or portable computers, hand-held devices and other wireless communication devices typically fail to include a keyboard, a large display, a mouse, a printer, or any other peripheral. In some instances such peripherals do exist but are either cumbersome or too small for effective use. Such devices may utilize a docking station or a port replicator to attach a standard set of peripheral devices to the computing platform. A physical connection is made between the hand-held device and the docking station, at which time the docking station provides the necessary ports to connect to those peripherals.

The primary purpose of replicators or docking stations is to provide a fast and convenient mechanism to allow the hand-held device to attach or detach from peripheral devices. This is achieved by plugging the hand-held device into the docking station, however it is not necessary to physically connect and disconnect each of the peripheral devices from the hand-held device.

With the emergence of wireless technologies, hardwired docking station connections are replaced with a wireless connection, typically by means of an ultra-wideband (UWB) connection. Examples for such wireless docking stations can be found, for example, in US patent applications Nos. 20050246470 and 20060061963, incorporated herein by reference for the useful understanding of the background of the invention.

The solutions in the above-cited applications enable wireless connectivity between a hand-held device and its respective peripherals by providing a wireless computer docking system. Specifically, a hand-held device is equipped with a UWB wireless transceiver to form a wireless connection with UWB-enabled peripheral devices without the need for a physical docking station. That is, these solutions are based on an UWB link that emulates an undefined type of input/output (I/O) bus.

Such architectures introduce major drawbacks that limit the performance of the hand-held device. For example, the UWB link requires a dedicated-controller to allow the I/O bus to operate with different peripheral standards. It also requires the installation of dedicated software to map peripheral interfaces to the I/O bus. In addition, the UWB link multiplexes between peripheral devices in order to transfer data on a relatively small bandwidth.

It would be therefore advantageous to provide a solution that would provide a wireless docking system that overcomes the drawbacks of prior art solutions.

DETAILED DESCRIPTION OF THE INVENTION

To overcome the shortcomings of the prior-art docking stations or port replicators, a wireless docking station is provided that allows the wireless connection between a hand-held computing device and a plurality of peripheral devices by unwiring the main computing bus of the hand-held device. The hand-held device may be, but is not limited to, a personal computer, a laptop computer, a notebook computer, a media player, a mobile phone, a personal digital assistant (PDA), and the likes.

Figure 1:
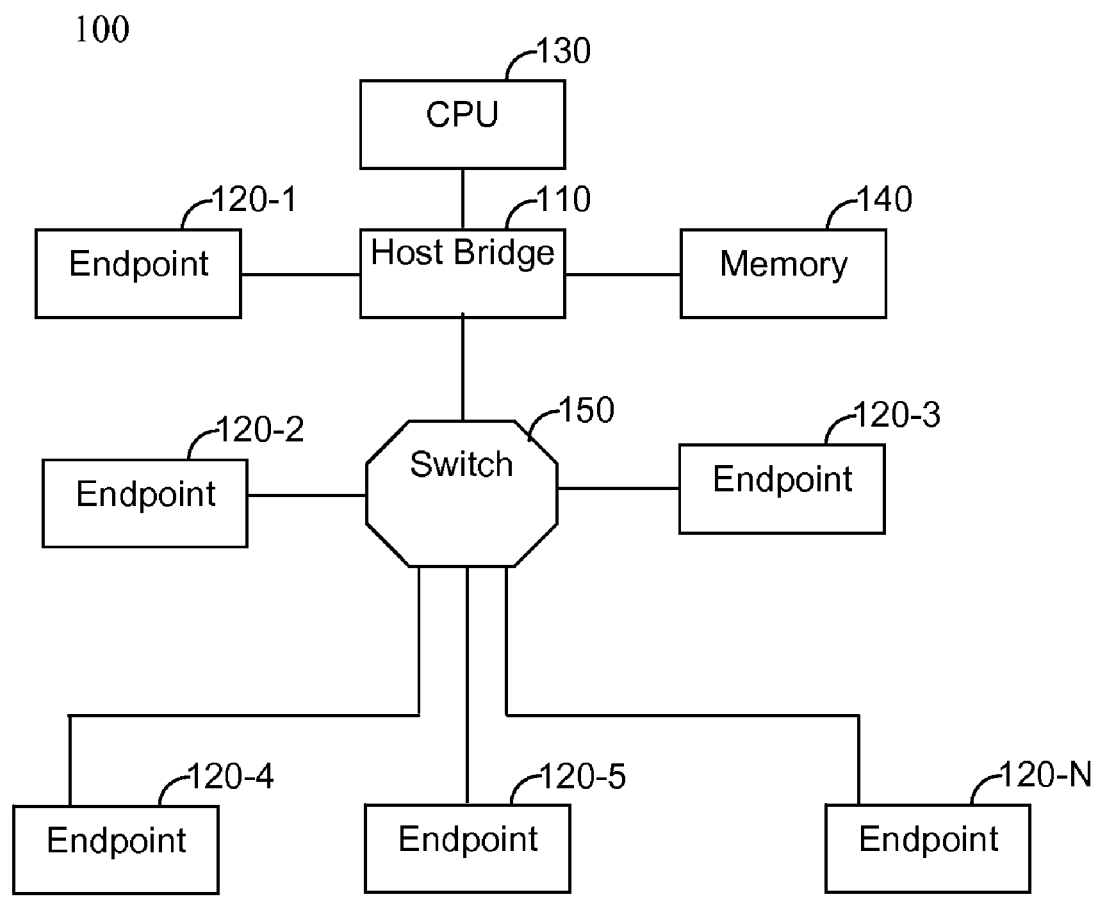
FIG. 1—is an illustration of a typical architecture of a hand-held device useful in describing the principles of the invention.

FIG. 1 shows an exemplary illustration of a typical architecture 100 of a hand-held computing device useful for describing the principles of the invention. The architecture 100 is based on a main computing bus which is, for example, a peripheral component interconnect express (PCIe) bus. A host bridge 110 is coupled to endpoints 120, a central processing unit (CPU) 130, a memory 140, and a switch 150. Typically, the host bridge 110 and the switch 150 are referred to as a "north bridge" and a "south bridge" respectively. The peripheral components are connected through endpoints 120. Multiple point-to-point connections are accomplished by the switch 150, which provides the fanout for the I/O bus. The switch 150 provides peer-to-peer communication between different endpoints 120. That is, traffic between switch 150 and endpoints 120 that does not involve cache-coherent memory transfers, is not forwarded to the host bridge 110. The switch 150 is shown as a separate logical element but it could be integrated into the host bridge 110.

The wireless connection between a hand-held device and respective peripherals is achieved by unwiring the "north bridge" from the "south bridge". In accordance with principles of the invention this is achieved by means of a wireless interconnect bus, for example, a wireless PCIe bus. Examples for such buses may be found in U.S. provisional application 60/938,190 entitled "A Wireless Interconnect Bus" and in U.S. provisional application entitled 60/950,691 "A Distributed Interconnect Bus". Both applications are assigned to common assignee and which are hereby incorporated herein, in their entirety, by reference thereto.

Figure 2:
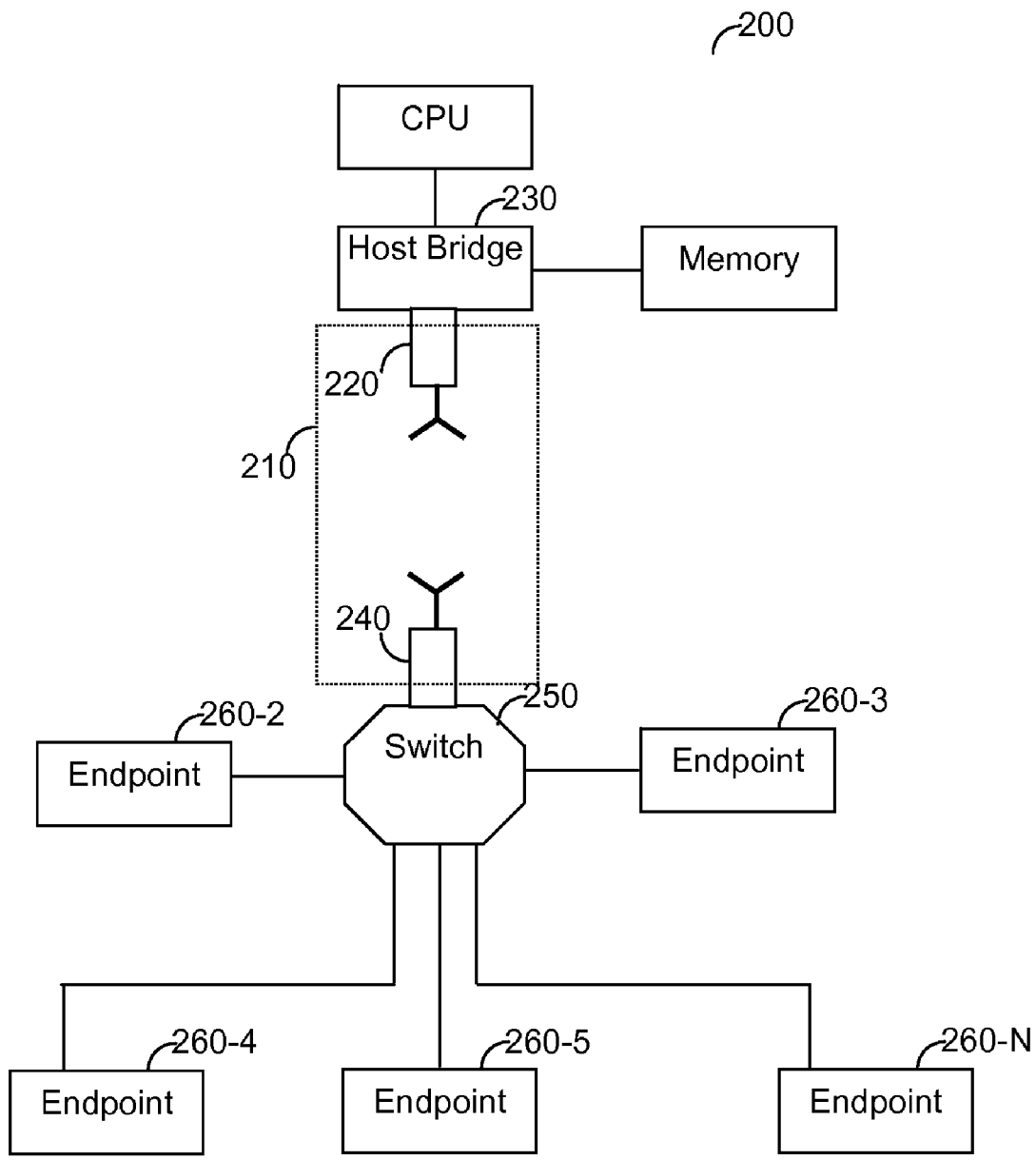
FIG. 2—is an illustration of a typical architecture of a hand-held device that includes a wireless interconnect bus constructed useful for explaining certain exemplary embodiments of the invention.

FIG. 2 shows an illustration of a typical architecture 200 of a hand-held computing device that includes a wireless interconnect bus 210. The wireless interconnect bus 210 includes a first transceiver 220 which is coupled to a host bridge 230 (the "north bridge") and a second transceiver 240 coupled to a switch 250 (the "south bridge"). The host bridge 230 identifies the endpoints 260 connected to the switch 250 as a standard endpoint. That is, there is no need to install specific software in order to recognize and communicate with peripherals coupled to the endpoints 260. Specifically, the communication protocols between the switch 250 and endpoints 260 may be any of a high-definition multimedia interface (HDMI), a digital visual interface (DVI), a serial advanced technology attachment (SATA), a video graphics array (VGA), a universal serial bus (USB), PCIe, Bluetooth and the likes.

In one embodiment of the invention the wireless interconnect bus 210 emulates a wireless PCI Express (wPCIe™) bus. In this embodiment the link between the first transceiver 220 and a second transceiver 240 aggregates an unbound number of PCIe lanes with a transfer data rate of 2.5 Gb/s per lane over an unlicensed frequency band like 57-64 GHz or 5-6 GHz. In an exemplary embodiment the number of aggregated lanes is 32. It would be apparent to a person skilled in the art that the bandwidth of the aggregated lanes is sufficient to wirelessly transfer data from or to peripherals without multiplexing between them.

Figure 3:
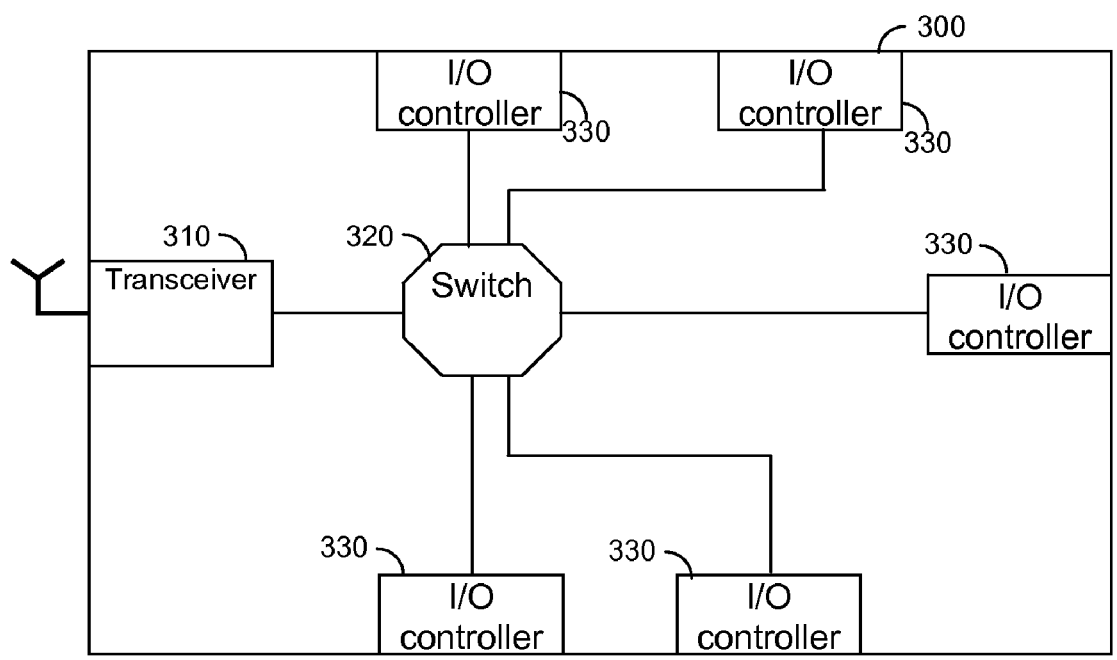
FIG. 3—is a non-limiting block diagram of a wireless docking station useful for explaining certain exemplary embodiments of the invention.

FIG. 3 shows a non-limiting block diagram of a wireless docking station 300 in accordance with an embodiment of the invention. The docking station 300 includes a wireless transceiver 310 coupled to a switch 320, and a plurality of input/output (I/O) controllers 330 that connect to the switch 320. The wireless transceiver 310 receives and transmits wireless signals from and to a hand-held device, which communicates using the transceiver 220. In one embodiment the wireless signals are preferably in a form of symbols. The wireless transceiver 310 controls and manages the access to the wireless link in either a full-duplex or half-duplex mode of operation. Furthermore, the wireless transceiver 310 establishes the link between the docking station 300 and the hand-held device and acts as a medium access controller (MAC) layer. The wireless transceiver 310 is also capable of reconstructing data from the received symbols.

To perform the tasks mentioned above the wireless transceiver 310 preferably includes a wireless receiver and wireless transmitter (not shown) that together implement a wireless modem, such as an orthogonal frequency division multiplexing (OFDM) modem, a single-carrier modem, a multi-carrier modem, and the likes. Furthermore, the wireless receiver and wireless transmitter can implement sophisticated communication techniques, such as multiple-input-multiple-output (MIMO), beam forming, advanced coding, space time block codes, and so on. The wireless transceiver 310 further supports a layered protocol of the wireless interconnect bus. Such protocol includes at least a wireless physical (WPHY) layer 410, a wireless adaptation layer 420, a data link layer 430, and a transaction layer 440. The operation of this layered protocol is described in detail in the 60/938,190 provisional application mentioned above.

The data constructed by the wireless transceiver 310 is fed to the switch 320 which may be operated in accordance to any standards that includes, but is not limited to, USB3, PCIe, PCIe second generation, Hypertransport, Infiniband, and the like. In accordance with an embodiment of the present invention the docking station 300 may include a bridge for transforming data from a first protocol (e.g., a PCIe) to a second protocol (e.g., a PCI). The I/O controllers 330 interface between peripheral devices connected to the docking station 300 and the hand-held device. The I/O controllers 330 may communicate with any type of peripheral device including, but not limited to, a monitor, a keyboard, a pointing device, a mouse, a storage device, a speaker, a microphone, a modem, a compact disk (CD) player, a digital video disc (DVD) player, a projector, and the likes.

The connections between the peripheral devices and the I/O controllers 330 may be, but are not limited to, PCIe, USB1.1, USB2.0, parallel, RS232 serial, PS/2-style mouse, keyboard connector audio like connection, SATA, VGA, DVI, HDMI-like monitor connections, and others.

It would be apparent to a person skilled in the art that as the I/O controllers 330 manages the communication between the peripherals and the hand-held device there is no need to install dedicated software to map standard peripheral interfaces to a format of a dedicated bus.

Figure 4:
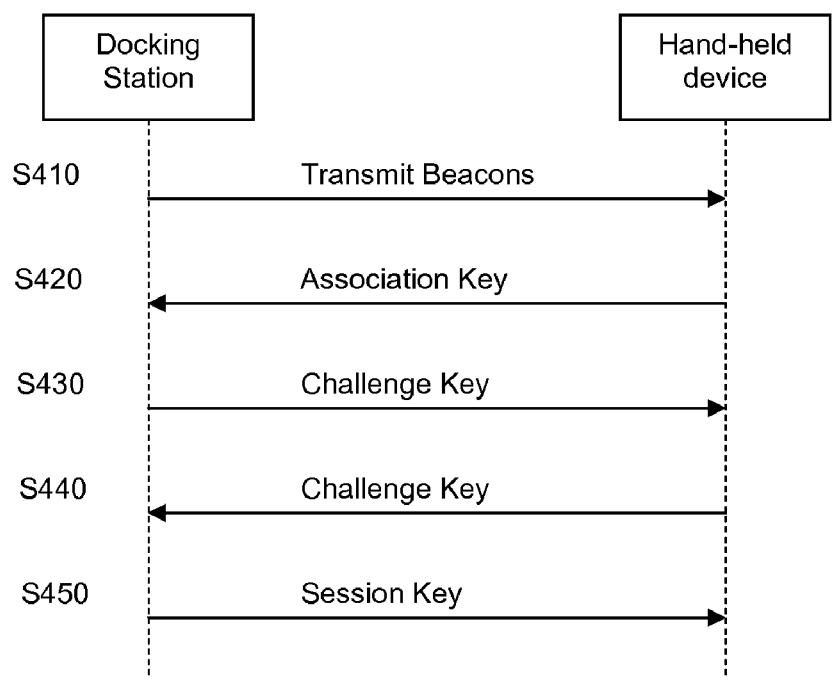
FIG. 4—is a non-limiting and exemplary diagram that describes the dock-in process realized in accordance with the principles of an embodiment of the invention.

FIG. 4 shows a non-limiting and exemplary diagram 400 describing the dock-in process in accordance with principles of an exemplary embodiment of the invention. The dock-in process refers to wireless connecting of a hand-held computing device to the docking station 300. Such connection is achieved if a hand-held device is placed in proximity of a docking station 300. At S410 the docking station 300 periodically transmits beacons to indicate that it is available. The beacons are transmitted on one or more specific allocated channels. The hand-held device scans the allocated channel (s) to detect beacons transmitted by the docking station 300. At S420, the hand-held device sends an association request key to the docking station 300 with a unique identification (ID) number. In response, at S430, the docking station 300 sends a challenge connection key. At S440 the hand-held device responds with its challenge connection key. At S450 the docking station 300 may accept or reject the association with the hand-held device by sending a response that includes a session key. If the session key is accepted a connection is established between the docking station 300 and the hand-held device. The keys used for challenge, association, and session are pre-determined using a pairing process which is performed during the initialization of the docking station and hand-held device. These keys are encrypted using, for example, an advanced encryption standard (AES) encryption technique, and the likes.

In order to "dock-out", i.e., disconnecting the hand-held device from the docking station, the hand-held device sends a dock-out request signal. As a result, the docking station replies with undocked acknowledge signal. Thereafter, the connection session is disconnected and the first transceiver is switched to a scanning mode. The docking out process also applies if the hand-held device just moves out of "docking range."

In accordance with an exemplary embodiment of the invention the bus connecting the hand-held device and the docking station is a wireless PCI express bus. In this embodiment the dock-in and dock-out processes can be implemented as "hot" plug-in and plug-out. That is, connecting or disconnecting the hand-held device while is still operating. This can be performed without the need to install dedicated software, hardware or combination therefore either in the hand-held devices of the docking station.

It is important to note that these embodiments are only examples of the many advantageous uses of the innovative teachings herein. Moreover, some statements may apply to some inventive features but not to others. In general, unless otherwise indicated, it is to be understood that singular elements may be in plural and vice versa with no loss of generality.

The principles of the present invention may be implemented as a combination of hardware, firmware and software and because some of the constituent system components and methods depicted in the accompanying drawings may be implemented in software, the actual connections between the system components or the process function blocks may differ depending upon the manner in which the invention is programmed. The software may be embodied on a computer readable medium.

The functions of the various elements shown in the figures may be provided through the use of dedicated hardware as well as hardware capable of executing appropriate software. When provided by a processor, the functions may be provided by a single dedicated processor, by a single shared processor, or by a plurality of individual processors, some of which may be shared. Explicit use of the term "processor" or "controller" should not be construed to refer exclusively to hardware capable of executing software, and may implicitly include, without limitation, digital signal processor hardware, ROM, RAM, and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A wireless docking station for enabling a wireless connection between a computing device and a plurality of peripheral devices, the wireless docking system comprising:
   a wireless transceiver for wirelessly communicating with the computing device over a wireless peripheral component interconnect express bus;
   a peripheral component interconnect express switch coupled to the wireless transceiver and to a plurality of input/output (I/O) controllers for sharing a connection point to the computing device with the plurality of peripheral devices, wherein each of the plurality of I/O controllers is connected separately and independently to the peripheral component interconnect express switch; and
   a plurality of I/O controllers for communicating with the plurality of the peripheral devices, wherein each of the plurality of I/O controllers communicates with a respective peripheral device using a standard peripheral connection respective of the peripheral device, wherein the wireless docking station wirelessly communicates with the computing device over the wireless peripheral component interconnect express bus, wherein a host bridge of the computing device identifies the plurality of I/O controllers connected to the switch as standard peripheral component interconnect express endpoints.

2. The wireless docking station of claim 1, wherein the switch supports a interconnect communication protocol including at least a peripheral component interconnect express (PCIe) protocol.

3. The wireless docking station of claim 1, wherein the standard peripheral connection between a peripheral device and an I/O controller comprises is any one of: a PCIe connection, a USB connection, a parallel connection, a RS232 serial connection, a PS/2-style mouse connection, a keyboard connection, an audio like connection, a serial advanced technology attachment (SATA) connection, a video graphics array (VGA) connection, a digital visual interface (DVI) connection, and a high-definition multimedia interface (HDMI) like connection.

4. The wireless docking station of claim 3, wherein the wireless transceiver controls and manages access to the wireless peripheral component interconnect express bus between the computing device and the switch in a full-duplex mode of operation.

5. The wireless docking station of claim 1, wherein the wireless transceiver operates in a full duplex mode.

6. The wireless docking station of claim 1, wherein the wireless transceiver operates in a half-full duplex mode.

7. The wireless docking station of claim 1, wherein the wireless transceiver is further configured to:
   establish a data link between the wireless docking station and the computing device over the wireless peripheral component interconnect express bus for wireless transferring data between the plurality of peripheral devices and the computing device.

8. The wireless docking station of claim 7, wherein the wireless transceiver is a wireless data modem.

9. The wireless docking station of claim 8, wherein the wireless data modem is at least any one of: an orthogonal frequency division multiplexing (OFDM) modem, a single-carrier modem, and a multi-carrier modem.

10. The wireless docking station of claim 1, wherein the wireless transceiver implements at least a layered protocol of the wireless peripheral component interconnect express bus.

11. The wireless docking station of claim 1, wherein the wireless communication between the docketing station and the computing device is over a frequency band of 60 Ghz.

12. A dock-in method for wirelessly connecting between a wireless docking station and a computing device over a wireless link, comprising:
   receiving, over a wireless peripheral component interconnect express bus, an association key from the computing device to the wireless docking station, wherein the association key includes a unique identification (ID) number;
   sending, over the wireless peripheral component interconnect express bus, a first challenge connection key by the wireless docking station to the computing device;
   receiving, over the wireless peripheral component interconnect express bus, a second challenge connection key from the computing device in response to the first challenge connection key; and
   sending, over the wireless peripheral component interconnect express bus, a session key, by the wireless docking station, in response to the second challenge, thereby establishing a wireless connection between the wireless docking station and the computing device over the wireless peripheral component interconnect express bus, wherein the wireless docking station includes a plurality of I/O controllers connected separately and independently to a peripheral component interconnect express switch, wherein a host bridge of the computing device identifies the plurality of I/O controllers as standard peripheral component interconnect express endpoints.

13. The method of claim 12, further comprising:
periodically transmitting beacons by the wireless docking station, wherein the computing device sending the association key in response to receiving a beacon.

14. The method of claim 12, wherein the computing device is at least any one of: a laptop computer, a notebook computer, a media player, a mobile phone, and a personal digital assistant (PDA).

15. The method of claim 12, further comprising:
establishing a connection between the wireless docking station and a peripheral device.

16. The method of claim 12, wherein the peripheral device is at least any one of: a monitor, a keyboard, a pointing device, a mouse, a storage device, a speaker, a microphone, a modem, a CD player, and a DVD player.

17. The method of claim 14, wherein the wireless docking station enables the computing device to wirelessly connect to a plurality of peripheral devices.

18. The method of claim 12, wherein the challenge connection key, the association key and session key are predetermined using a pairing process.

19. The method of claim 12, wherein the challenge connection key, the association key and session key are predetermined and encrypted.

20. A non-transitory computer readable medium having stored thereon one or more machine executable instructions that, when executed by a machine, implement a dock-in method wirelessly connect between a computing device and a wireless docking station, wherein the dock-in method enables a wireless connection between the computing device and the wireless docking station, comprising:

receiving, over a wireless peripheral component interconnect express bus, an association from the computing device to the wireless docking station, wherein the association key includes a unique identification (ID) number;

sending, over the wireless peripheral component interconnect express bus, a first challenge connection key in response to the sending of the association key;

receiving, over the wireless peripheral component interconnect express bus, a second challenge connection key from the computing device in response to the first challenge connection key; and sending, over the wireless peripheral component interconnect express bus, a session key, by the wireless docking station, in response to the second challenge connection key, thereby establishing a wireless connection between the wireless docking station and the computing device over the wireless peripheral component interconnect express, wherein the wireless docking station includes a plurality of I/O controllers connected separately and independently to a peripheral component interconnect express switch, wherein a host bridge of the computing device identifies the plurality of I/O controllers as standard peripheral component interconnect express endpoints.

21. The non-transitory computer readable medium of claim 20, further comprising instructions for:
enabling the computing device to connect to peripherals through the wireless docking station.

22. The non-transitory computer readable medium of claim 21, further comprising instructions for:
periodically transmitting beacons by the wireless docking station, wherein the computing device sending the association key in response to receiving a beacon.

* * * * *